(12) United States Patent
Chapman

(10) Patent No.: US 10,284,672 B2
(45) Date of Patent: May 7, 2019

(54) NETWORK INTERFACE

(71) Applicant: ZOMOJO PTY LTD, Sydney, New South Wales (AU)

(72) Inventor: Matthew Chapman, Coogee (AU)

(73) Assignee: ZOMOJO PTY LTD, Sydney, New South Wales (AU)

(*) Notice: Subject to any disclaimer, the term of this patent is extended or adjusted under 35 U.S.C. 154(b) by 271 days.

(21) Appl. No.: 15/026,946

(22) PCT Filed: Oct. 17, 2014

(86) PCT No.: PCT/AU2014/000994
§ 371 (c)(1),
(2) Date: Apr. 1, 2016

(87) PCT Pub. No.: WO2015/054738
PCT Pub. Date: Apr. 23, 2015

(65) Prior Publication Data
US 2016/0241666 A1 Aug. 18, 2016

(30) Foreign Application Priority Data
Oct. 18, 2013 (AU) .............................. 2013245529

(51) Int. Cl.
*G06F 5/00* (2006.01)
*H04L 29/08* (2006.01)
(Continued)

(52) U.S. Cl.
CPC ...... *H04L 67/2842* (2013.01); *H04L 49/9021* (2013.01); *H04L 49/9047* (2013.01); *H04L 67/1097* (2013.01)

(58) Field of Classification Search
CPC ....... G06F 13/28; G06F 3/0638; G06F 3/0659
(Continued)

(56) References Cited

U.S. PATENT DOCUMENTS 7,835,380 B1 11/2010 Aloni et al.
2003/0152036 A1 8/2003 Brown et al.
(Continued)

FOREIGN PATENT DOCUMENTS

EP 0 459 757 B1 7/1999
EP 1338965 A2 8/2003
(Continued)

OTHER PUBLICATIONS

Extended European Search Report dated Jun. 19, 2017 corresponding to European Application No. 14854137.8, filed Oct. 17, 2014.
(Continued)

*Primary Examiner* — Tim T Vo
*Assistant Examiner* — Kim T Huynh
(74) *Attorney, Agent, or Firm* — Knobbe Martens Olson & Bear, LLP

(57) ABSTRACT

A low-latency network interface and complementary data management protocols are disclosed in this specification. The data management protocols reduce dedicated control exchanges between the network interface and a corresponding host computing system by consolidating control data with network data. The network interface may also facilitate port forwarding and data logging without an external network switch.

18 Claims, 8 Drawing Sheets

(51) Int. Cl.
*H04L 12/883* (2013.01)
*H04L 12/861* (2013.01)

(58) Field of Classification Search
USPC .................. 710/52, 305–306, 240–244, 200
See application file for complete search history.

(56) References Cited

U.S. PATENT DOCUMENTS

| | | | |
|---|---|---|---|
| 2006/0075119 A1* | 4/2006 | Hussain | H04L 49/90 |
| | | | 709/227 |
| 2007/0260777 A1 | 11/2007 | Timpe et al. | |
| 2008/0028103 A1 | 1/2008 | Schlansker et al. | |
| 2012/0093170 A1* | 4/2012 | Cantu | H04L 49/901 |
| | | | 370/415 |
| 2016/0241666 A1* | 8/2016 | Chapman | H04L 67/1097 |

FOREIGN PATENT DOCUMENTS

| | | |
|---|---|---|
| JP | 2008-097273 | 4/2008 |
| RU | 2388039 C2 | 4/2010 |
| WO | WO 2013/136355 | 9/2013 |

OTHER PUBLICATIONS

Partial Supplementary European Search Report dated Mar. 10, 2017 corresponding to European Application No. 14854137.8, filed Oct. 17, 2014.

International Preliminary Report on Patentability dated Feb. 5, 2016 in International Application No. PCT/AU2014/000994.

International Search Report dated Jan. 16, 2015 in International Application No. PCT/AU2014/000994.

Examination Report dated Jul. 25, 2018 in corresponding Russian Patent Application No. 2016118760/08(029465).

Examination Report dated Sep. 25, 2018 in corresponding Japanese Patent Application No. 2016-523907.

Examination Report No. 1 dated Mar. 27, 2018 for Australian patent application No. 2014336967.

\* cited by examiner

NETWORK INTERFACE

FIELD OF THE INVENTION

The present invention relates to a network interface for a computing system and methods of managing data communication.

BACKGROUND

A network interface facilitates communication between a computing system and a data network. Typical network interfaces have dedicated hardware that establishes a communications link with an external network. The hardware may be integrated with other components of a host computing system. Dedicated firmware and/or software may also be incorporated into the network interface. Common names for network interfaces include network interface card (NIC), network interface controller, network interface adapter and network interface unit.

Network capable computing systems generally have at least one dedicated network interface. The network interface provides a bridge between the internal system bus of the host computing system (such as a PCI or PCI Express bus) and an external data network (such as an Ethernet network). Network interfaces may be integrated with other system components (such as 'on-board' network controllers that are integrated with the system motherboard) or supplied as modular components (such as a PCI-e card).

Conventional network interfaces have two primary functions: receiving data from an external network and; transmitting data from the host computing system to the external network. The network interface interacts with the system bus of the host computing system during both operations to manage the exchange of data. These interactions conform to protocols (generally defined by the network interface and implemented by a driver for the network interface) that allow software applications executed by the host computing system to interact with the network interface.

Conventional interface driver protocols generally prioritize resource optimisation at the expense of communications latency. Data transactions between a network interface and host computing system using conventional driver protocols typically include control message exchanges to coordinate data transfer (such as the exchange of data allocation pointers and read confirmations). This can introduce significant latency that delays the transfer of network data between systems.

SUMMARY OF THE INVENTION

In a first aspect, the present invention provides a data reception process comprising receiving data from an external network via a network interface and transferring the data to memory within a host computing system via an internal system bus. The network interface prescribes the allocation of data within the host computing system memory without intervention from the host computing system.

In a second aspect, the data reception process comprises:
receiving a plurality of data frames from an external network via a network interface, and
transferring each of the data frames from the network interface to a receive buffer allocated within memory of a host computing system via an internal system bus,
the network interface prescribing the allocation of data frames within the receive buffer without intervention from the host computing system.

In an embodiment, the process comprises transferring each of the received data frames from the network interface to the receive buffer using an open-loop write protocol.

In an embodiment, the process comprises writing the received data frames successively to a continuous memory range within the receive buffer.

In an embodiment, the process comprises allocating the receive buffer within continuous memory having storage capacity for a plurality of data frames.

In an embodiment, the process comprises dividing the allocated memory into a plurality of consecutive individually addressable slots of homogeneous storage capacity.

In an embodiment, the process comprises writing received data frames consecutively to each of the slots within the receive buffer.

In an embodiment, the process comprises recursively overwriting the receive buffer without read confirmation from the host computing system.

In an embodiment, the process comprises fragmenting received data frames that exceed the storage capacity of the slots and allocating the frame fragments to a plurality of consecutive slots within the receive buffer.

In an embodiment, the process comprises generating control data that facilitates reconstruction of fragmented data frames by defining the relationship of frame data in consecutive slots.

In an embodiment, the process comprises appending the control data to the end of each frame fragment so that the control data is written to the end of a corresponding slot in the same bus transaction as the frame fragment.

In an embodiment, the control data also defines the length of the frame fragment allocated to the corresponding slot.

In a third aspect, the present invention provides a network interface comprising a network side that receives data from an external data network, a host side that transfers the data to memory within a host computing system via an internal system bus, and a control system that prescribes the allocation of data within the host computing system memory without intervention from the host computing system.

In a fourth aspect, the network interface comprises:
a network side that receives a plurality of data frames from an external data network,
a host side that transfers the data frames to a receive buffer allocated within memory of a host computing system via the hosts internal system bus, and
a control system that prescribes the allocation of data frames within the receive buffer without intervention from the host computing system.

In an embodiment, the network interface comprises a write controller that transfers each of the received data frames to the receive buffer using an open-loop write protocol.

In an embodiment, the write controller is configured to write the data frames successively to a continuous memory range within the receive buffer.

In an embodiment, the network interface comprises a buffer management module that allocates a plurality of consecutive individually addressable slots of homogeneous storage capacity within continuous memory allocated to the receive buffer.

In an embodiment, the network interface comprises a write controller that transfers received data frames consecutively to each of the slots within the receive buffer.

In an embodiment, the write controller recursively overwrites the receive buffer without read confirmation from the host computing system.

In an embodiment, the network interface comprises a frame management module that fragments received data frames that exceed the storage capacity of the slots and allocates the frame fragments to a plurality of consecutive slots within the receive buffer.

In an embodiment, the frame management module generates control data that facilitates reconstruction of fragmented data frames by defining the relationship of frame data in consecutive slots.

In an embodiment, the write controller appends the control data to the end of each frame fragment so that the control data is written to the end of a corresponding slot in the same bus transaction as the frame fragment.

In an embodiment, the control data also defines the length of the frame fragment allocated to the corresponding slot.

In a fifth aspect, the present invention provides a buffer access protocol comprising:

reading a write iteration counter from a plurality of slots within a memory buffer, the write iteration counter defining when data was last written to the respective slot, determining a write address that defines the next slot to receive data, the write address being determined from the write iteration counters, and recurrently polling the write address to detect a write update for the corresponding slot.

In a sixth aspect, the buffer access protocol comprises:

accessing a plurality of data slots within a circular buffer and reading a write iteration counter from each of the accessed slots, the write iteration counter defining a write iteration when data was last written to the respective slot, determining a write address for the circular buffer that defines the next slot to be overwritten with data, the write address being defined by a transition in the write iteration counter assigned to adjacent slots, and recurrently polling the write address to detect a write update, the write update being determined from a change in the write iteration counter for the corresponding slot.

In an embodiment, the protocol comprises:

copying a write iteration counter from a designated slot within the circular buffer and establishing a read iteration counter from the copied write iteration counter, and comparing the read iteration counter to a plurality of write iteration counters assigned to consecutive slots within the circular buffer to identify the write address.

In an embodiment, the protocol comprises:

initiating a read pointer at a designated slot within the circular buffer, comparing the write iteration counter assigned to the designated slot with the read iteration counter, and incrementing the read pointer to align with successive slots within the circular buffer until the read pointer coincides with the write address.

In an embodiment, the protocol comprises incrementing the read pointer to align with a successive slot after detecting a write update.

In an embodiment, the protocol comprises maintaining a loop counter for the circular buffer that defines a current write iteration, the loop counter being incremented at the conclusion of each write iteration.

In an embodiment, the protocol comprises writing the loop counter to each slot within the circular buffer with each write transaction to the respective slots, the loop counter providing a write iteration counter for read synchronization.

In an embodiment, the protocol comprises:

extracting data from a slot corresponding to the write address when a write update is detected, checking the write iteration counter following extraction of the data to validate the extraction process, and generating a read error if the write iteration counter has changed subsequent to detection of the write update.

In an embodiment, the protocol comprises:

reading a length reference from a current slot corresponding to the write address following a write update, and combining data from the current slot with data from a successive slot when the length reference indicates the current slot contains a frame fragment.

In a seventh aspect, the present invention provides a buffer access system comprising:

a reference module that reads a write iteration counter from a plurality of data slots within a memory buffer, the write iteration counter defining when data was last written to the respective slot, a synchronization module that determines a write address defining the next slot to receive data, the write address being determined from the write iteration counters, and a write monitor that recurrently polls the write address to detect a write update for the corresponding slot.

In an eighth aspect, buffer access system comprises a reference module that accesses a plurality of data slots within a circular buffer and evaluates a write iteration counter from each of the accessed slots, the write iteration counter defining a write iteration when data was last written to the respective slots, a synchronization module that determines a write address for the circular buffer, the write address defining the next slot to be overwritten with data, and a write monitor that recurrently polls the write address to detect a write update, the write update being determined from a change in the write iteration counter for the corresponding slot.

In an embodiment the reference module copies a write iteration counter from a designated slot within the circular buffer and establishing a read iteration counter from the copied write iteration counter, and the synchronization module compares the read iteration counter to a plurality of write iteration counters assigned to consecutive slots within the circular buffer to identify the write address.

In an embodiment, the synchronization module initiates a read pointer at a designated slot within the circular buffer, compares the write iteration counter assigned to the designated slot with the read iteration counter and increments the read pointer to align with successive slots within the circular buffer until the read pointer coincides with the write address.

In an embodiment, synchronization module increments the read pointer to align with a successive slot within the buffer when the write monitor detects a write update.

In an embodiment, the system comprises an extraction module that extracts data from slots corresponding to the write address when a write update is detected, checks the write iteration counter following extraction of the data to validate the extraction process, and generates a read error if the write iteration counter has changed subsequent to detection of the write update.

In an embodiment, the system comprises a frame reconstruction module that reads a length reference from a current slot corresponding to the write address following a write update, and combines data from the current slot with data from a successive slot when the length reference indicates that the respective slots contain data from a single frame.

In a ninth aspect, the present invention provides a data transmission process comprising buffering outgoing network data within a host computing system processor and directly writing the buffered outgoing network data to dedicated memory within a network interface that is mapped to a local memory hierarchy within the host computing system.

In a tenth aspect, the data transmission process comprises:

mapping dedicated memory from a network interface to a local memory hierarchy within a host computing system, buffering outgoing network data within a write-combine buffer of the host computing system processor, writing the outgoing network data from the write-combine buffer to the dedicated memory, and transmitting the data from the network interface to an external network.

In an embodiment, the process comprises writing a frame reference to a separate control register within the network interface to initiate transmission of a data frame to an external network, the frame reference defining the location of a corresponding frame within the dedicated memory.

In an embodiment, the process comprises mapping the separate control register to base address register zero of the host computing system.

In an embodiment, the process comprises mapping the dedicated network interface memory to base address register two of the host computing system and enabling write-combining for the mapped memory.

In an embodiment, the process comprises extracting an individual data frame from the dedicated memory for transmission to an external network, the data frame being defined by a frame reference written to the separate control register and a frame length written with the data frame in the dedicated memory.

In an embodiment, the process comprises writing control data to the dedicated memory with the outgoing network data, the control data including a frame length that defines the size of a corresponding data frame.

In an embodiment, the process comprises incorporating feedback descriptors in the control data written to the dedicated memory with the outgoing network data, the feedback descriptors facilitating transmission of confirmation messages from the network interface to the host computing system.

In an embodiment, the process comprises writing a frame identifier from the dedicated memory to an allocated feedback register within host computing system memory to report transmission of a corresponding data frame from the network interface to an external network.

In an embodiment, the process comprises
extracting the frame identifier and a reference address defining the host computing system feedback register from the dedicated memory in a consolidated memory access transaction that includes extraction of a corresponding data frame.

In an eleventh aspect, the present invention provides a data transmission system comprising a memory management module that maps memory from a network interface to a local memory hierarchy within a host computing system, and a write controller that buffers outgoing network data within a host computing system processor before writing the outgoing network data directly to the mapped memory.

In a twelfth aspect, the data transmission system comprises:

a memory management module that maps dedicated memory from a network interface to a local memory hierarchy within a host computing system, and a write controller that buffers outgoing network data within a write-combine buffer before writing the outgoing network data to the dedicated network interface memory.

In an embodiment, the system comprises a control module that writes frame references to a separate control register within the network interface to initiate transmission of data frames from the network interface to the external network, the frame references defining the location of a corresponding frame within the dedicated memory.

In an embodiment, the memory management module maps the separate control register to base address register zero of the host computing system.

In an embodiment, the memory management module maps the dedicated network interface memory to base address register two of the host computing system and enables write-combining for the mapped memory.

In an embodiment, the system comprises a transmission engine that extracts individual data frames from the dedicated memory for transmission to an external network, the data frames being defined by a corresponding frame reference written to the separate control register and a frame length written in the dedicated memory with the data frame.

In an embodiment, the system comprises a control module that combines control data with the outgoing network data before the write controller writes the network data to the dedicated memory, the control data including a frame length that defines the size of a corresponding data frame.

In an embodiment, the control module incorporates feedback descriptors in the control data combined with the outgoing network data, the feedback descriptors facilitating transmission of confirmation messages from the network interface to the host computing system.

In an embodiment, the system comprises a notification engine that writes a frame identifier from the dedicated memory to an allocated feedback register within host computing system memory to report transmission of a corresponding data frame from the network interface to an external network.

In an embodiment, the notification engine extracts the frame identifier and a reference address defining the host computing system feedback register from the dedicated memory in a consolidated memory access transaction that includes extraction of a corresponding data frame.

In an thirteenth aspect, the present invention provides a network interface comprising a plurality of data ports that connect with an external data network and a control system that manages data exchanges between the data ports and an internal system bus of a host computing system, the control system including a logging module that replicates data exchanged between the system bus and individual data ports, and transfers the replicated data to a designated logging port.

In a fourteenth aspect the network interface comprises:

a network side that connects with an external data network to facilitate data exchanges, the network side having a plurality of data ports that each define a data channel for communications, a host side that connects with an internal system bus of a host computing system to facilitate data exchanges between the network interface and the host computing system, and a control system that manages data exchanges between the network side and the host side of the network interface, the control system including a logging module that replicates data from individual data channels and transfers the replicated data to a designated logging port.

In an embodiment, the network interface comprises a logging interface that facilitates configuration of the logging module, the logging interface having a plurality of control registers that define the data channels replicated by the logging module.

In an embodiment, the network interface comprises a logging controller that divides data from each data channel into a receive stream and a send stream, the logging interface having a plurality of control registers that define the data streams replicated by the logging module.

In an embodiment, the network interface comprises a logging unit that combines data from a plurality of data ports, the logging unit having a dedicated logging port that transmits the combined data to an external network.

In a fifteenth aspect, the present invention provides a data logging process comprising autonomously replicating network data within a computing system network interface and transferring the replicated data to a designated logging port of the network interface for transmission to an external logging system.

In a sixteenth aspect the data logging process comprises:

exchanging data between a host computing system and an external data network using a network interface having a plurality of data ports, the network interface being connected to an internal system bus of a host computing system, and replicating data from individual data ports and transferring the replicated data to a designated logging port integrated with the network interface.

In an embodiment, the process comprises selecting individual data ports for logging, the data ports being selected using dedicated control registers allocated within the network interface.

In an embodiment, the process comprises:

dividing data received at each of the data ports into a receive stream and a send stream, and selecting individual data streams for logging, the streams being selected using dedicated control registers allocated within the network interface.

In an embodiment, the process comprises combining data from a plurality of data ports and transmitting the combined data from a host computing system to an external network.

In a seventh aspect, the present invention provides a network interface comprising a plurality of data ports and a control system that manages data exchanges between the data ports and an internal system bus of a host computing system, the control system including a forwarding module that transfers data directly between separate data ports without intervention from the host computing system.

In an eighteenth aspect, the network interface comprises:

a network side that connects with an external data network to facilitate data exchanges, the network side having a plurality of data ports, a host side that connects with an internal system bus of a host computing system to facilitate data exchanges between the network interface and the host computing system, and a control system that manages data exchanges between the network side and the host side of the network interface, the control system including a forwarding module that receives data directly from a defined data port of the network interface and transfers the received data to an external data network via another data port of the network interface without intervention from the host computing system.

In an embodiment, the network interface comprises a forwarding interface that facilitates configuration of the forwarding module, the forwarding interface having a control register that disables data forwarding between two ports.

In an embodiment, the network interface comprises a filtering engine that reads destination addresses from data received by the forwarding module and prevents forwarding of data with a destination address that matches an address associated with the host computing system.

In a nineteenth aspect, the present invention provides a data forwarding process comprising receiving network data at a designated data port of a computing system network interface and transmitting the received data to an external data network via another port of the network interface without intervention from a host computing system.

In a twentieth aspect, the data forwarding process comprises:

receiving data from an external data network using a network interface having a plurality of data ports, the network interface being connected to an internal system bus of a host computing system, and forwarding data receive via a defined port of the network interface to another port of the network interface without intervention from the host computing system.

In an embodiment, the process comprises disabling forwarding between two network interface ports by writing to a control register within the network interface.

In an embodiment, the process comprises reading a destination addresses from data received by the forwarding module and preventing forwarding of data with a destination address that matches an address associated with the host computing system.

In a twenty first aspect, the present invention provides a data reception process comprises receiving data from at external network via a network interface and transferring the data to memory within a host computing system via an internal system bus, the network interface prescribing the allocation of data within the host computing system memory without intervention from the host computing system.

In a twenty second aspect, the present invention provides a network interface comprises a network side that receives data from an external data network, a host side that transfers the data to memory within a host computing system via an internal system bus, and a control system that prescribes the allocation of data within the host computing system memory without intervention from the host computing system.

In a twenty third aspect, the present invention provides a buffer access protocol comprises:

reading a write iteration counter from a plurality of slots within a memory buffer, the write iteration counter defining when data was last written to the respective slot, determining a write address that defines the next slot to receive data, the write address being determined from the write iteration counters, and recurrently polling the write address to detect a write update for the corresponding slot, In a twenty fourth aspect the present invention provides a buffer access system comprises:

a reference module that reads a write iteration counter from a plurality of data slots within a memory buffer, the write iteration counter defining when data was last written to the respective slot, a synchronization module that determines a write address defining the next slot to receive data, the write address being determined from the write iteration counters, and a write monitor that recurrently polls the write address to detect a write update for the corresponding slot.

In a twenty fifth aspect, the present invention provides a data transmission process comprising buffering outgoing network data within a host computing system processor and directly writing the buffered outgoing network data to dedicated memory within a network interface that is mapped to a local memory hierarchy within the host computing system.

In a twenty sixth aspect, the present invention provides a data transmission system comprising, a memory management module that maps memory from a network interface to a local memory hierarchy within a host computing system, and a write controller that buffers outgoing network data within a host computing system processor before writing the outgoing network data directly to the mapped memory.

In a twenty seventh aspect, the present invention provides a network interface comprising a plurality of data ports that connect with an external data network and a control system that manages data exchanges between the data ports and an internal system bus of a host computing system, the control system including a logging module that replicates data exchanged between the system bus and individual data ports, and transfers the replicated data to a designated logging port.

In a twenty eighth aspect, the present invention provides a data loaning process comprising autonomously replicating network data within a computing system network interface and transferring the replicated data to a designated logging port of the network interface for transmission to an external logging system.

In a twenty ninth aspect, the present invention provides a network interface comprising a plurality of data ports and a control system that manages data exchanges between the data ports and an internal system bus of a host computing system, the control system including a forwarding module that transfers data directly between separate data orts without intervention from the host computing system.

In a thirtieth aspect, the present invention provides a data forwarding process comprising receiving network data at a designated data port of a computing system network interface and transmitting the received data to an external data network via another port of the network interface without intervention from a host computing system.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION

Figure 1:
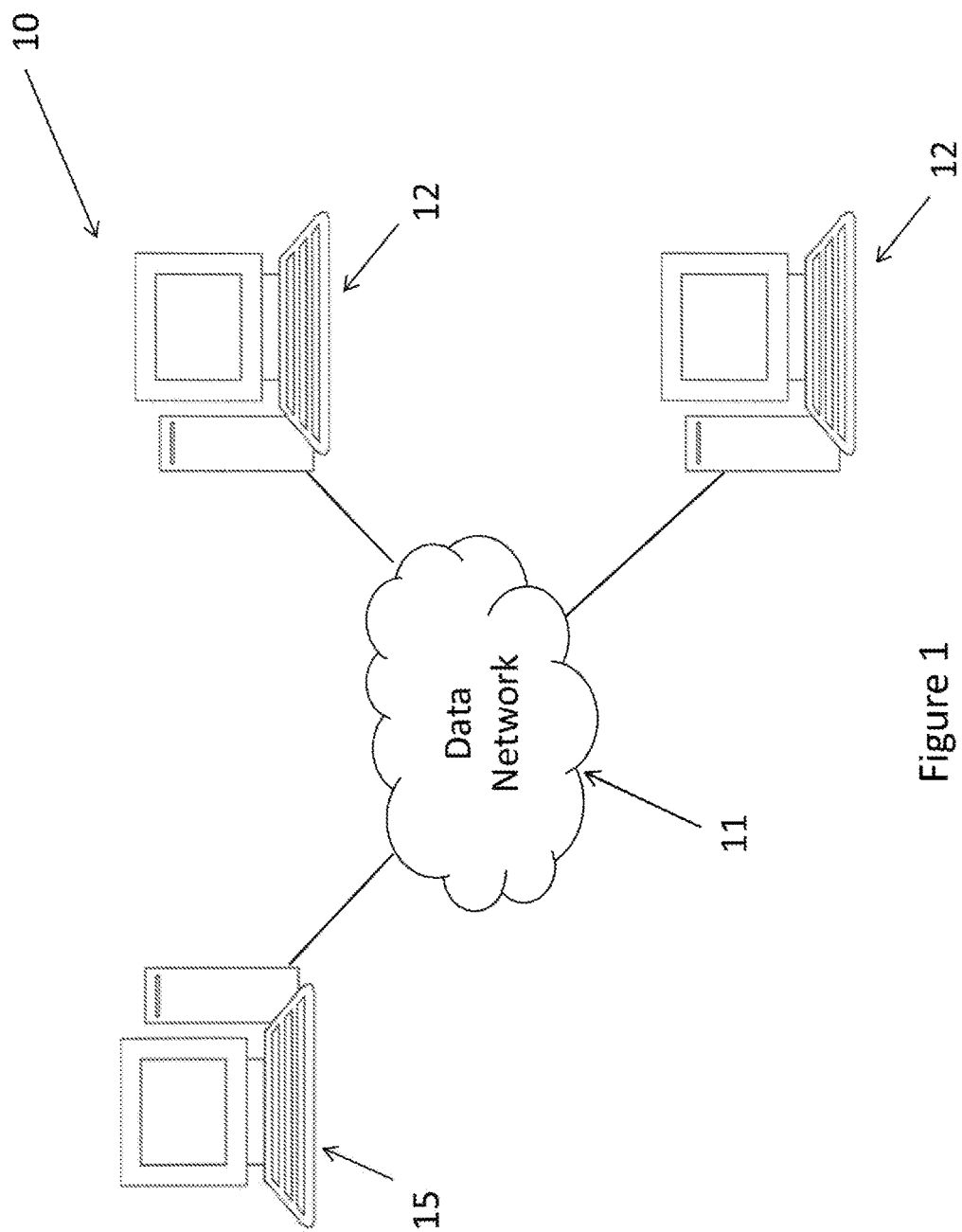
FIG. 1 is a schematic representation of a network comprising a plurality of interconnected computing systems.

An embodiment of a low-latency network interface and complementary data management protocols are described in this specification. The data management protocols reduce dedicated control exchanges between the network interface and a corresponding host computing system by consolidating control data with network data.

Reducing communication latency typically improves processing times for network intensive interactions. Embodiments of the send and receive protocols disclosed in the following sections limit exchanges between the network interface and a host computing system to reduce processing delays. Reducing overall latency by fractions of a second can have significant implications in high performance computing applications (such as online gaming and financial trading).

Network data is commonly transmitted between computing systems using discrete data 'frames' in conventional networking applications. Data frames are defined by the 'sender' system and may include control data (such as a destination address) that is used in the transmission process. The network interface embodiments described in this specification predominantly interact with 'frame' based network implementations (where data is communicated in frames). However, the general protocols may also be implemented with other networking standards.

Latency is a measure of the time taken for data to transit through a system. The 'reception latency' for a network interface represents the time between reception of a data frame from an external network and the frame becoming available for a software application executed on a corresponding host computing system. 'Transmission latency' for a network interface represents the time between a frame being made available from a software application executing on the host computing system and the frame being transmitted to an external network. Both reception and transmission latency are primarily attributable to the network interface.

Specific embodiments of data management protocols and interface features are attributed to discrete functional units in this specification (typically 'modules' and 'engines'). These functional units demonstrate the operation and interactions of the various interface elements they embody (both hardware and software). They do not represent strict operational divisions or specific hardware/software implementations. The operations attributed to multiple functional units may be executed by a single hardware component (such as a microprocessor or field programmable gate array), a software application (such as a driver or embedded software), a number of hardware components or a mix of hardware and software.

Reception of Data from an External Network

Conventional network interface protocols are coordinated by driver software executed on the host computing system. The driver typically allocates host memory to individual data frames and maintains an array of pointers (known as 'receive descriptors') in host memory as a record. The network interface accesses the 'receive descriptor' array when a new frame is received and copies the frame to a memory address defined by a corresponding pointer. The interface generates a system interrupt when the copy is completed to alert the host system that a new frame has been transferred. The driver software releases the pointer from subsequent use once the frame has been processed.

Embodiments of the network interface and receive protocol described in this section reduce the receive latency attributable to the network interface by eliminating several interactions with the host computing system. The disclosed network interface exchanges received network data with a host computing system using a receive buffer (or a small number of receive buffers) allocated in host computing system memory. Each receive buffer has capacity to store a plurality of data frames that have been received from an external network.

The network interface autonomously prescribes the allocation of data within the receive buffer without intervention from the host computing system (including the network interface driver). The interface typically allocates received data frames consecutively within the receive buffer using a circular first-in-first-out (FIFO) ordering protocol. The host computing system does not assign write addresses or dedicated buffers for individual frames received by the network interface.

The network interface recursively writes data frames to the receive buffer using an open-loop write protocol without feedback from the host computing system (such as read confirmations that indicates a frame has been extracted). This facilitates uncoordinated access to data within the receive buffer by multiple software applications executing on the host computing system. The network interface continuously writes new frames to the receive buffer during documented write iterations. Existing data within the buffer is overwritten during successive write iterations. The network interface typically appends standardized control data (including the current write iterations) to received frames as they are written to the receive buffer. The control data is used by the host computing system to extract frames from the receive buffer.

The host computing system implements a receive protocol that makes data frames from the receive buffer accessible to software application executing on the host computing system. The receive protocol facilitates the extraction and reconstruction of data frames stored in the receive buffer using the control data generated by the network interface.

A computing network 10 is depicted in FIG. 1. The network 10 comprises a plurality of interconnected computing systems. The computing systems are connected by a common data network 11 (such as the Internet or a Local Area Network).

The illustrated data network 11 facilitates communication between a host computing system 15 and a plurality of remote computing systems 12. The host computing system 15 incorporates a network interface that manages data exchanges with the data network 11.

Figure 2:
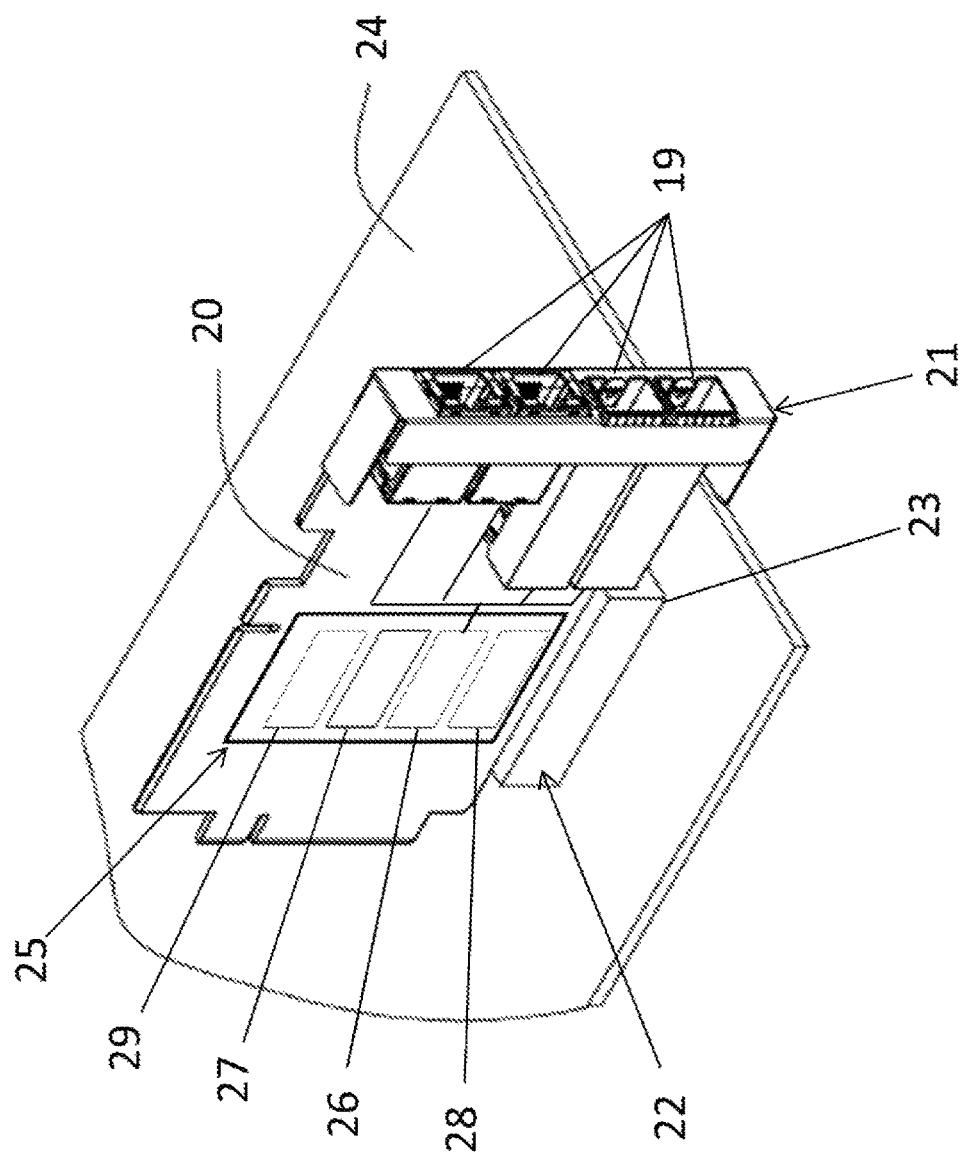
FIG. 2 is a schematic representation of a network interface depicting several functional modules.

A functional representation of a network interface 20 is depicted in FIG. 2. The interface 20 comprises a network side 21 that receives data from an external data network 11 and a system side 22 that transfers the received data to memory allocated within the host computing system 15 via an internal system bus.

The network side 21 of the network interface 20 depicted in FIG. 2 includes a plurality of data ports 19. Each data port 19 defines a data channel for the exchange of network data between the network interface control system 25 and an external data network. The data ports 19 may be integrated with physical connectors (such as the Small Form-Factor Modules depicted in FIG. 2) or define a wireless data channel connection with an external network.

The system side 22 of the network interface generally designates a functional junction between the network interface and the internal system bus (such as a functional division within a shared microcontroller for integrated applications). The functional junction defined by the system side 22 of the interface may coincide with a physical junction (such as a bus connector or wired interface on a PCB). The system side 22 of the network interface 20 depicted in FIG. 2 coincides with a PCI bus slot 23 of the host computing system motherboard 24. An interface control system 25 manages the transfer of data from the network side 21 to the system side 22 of the network interface 20.

The interface 20 receives data from the network 11 in 'frames'. Typical Ethernet frames range in size between 64 bytes and 1518 bytes. Data parcels that are greater than the maximum frame size are separated into a plurality of frames before transmission to the data network 11. The network interface transfers the frames received from the network to shared memory within the host computing system. This process is managed by the host computing system in conventional receive protocols.

The network interface 20 depicted in FIG. 2 transfers received frames to a consolidated buffer in host memory without intervention from the host computing system. This reduces overheads for receive transactions by eliminating several time intensive system interactions (including pointer allocation and system read confirmation message exchanges with the host computing system).

The interface control system 25 manages frame transfers from the network side 21 of the interface 20 to a system bus within the host computing system 15 (such as a PCI or PCI Express bus). The system bus transports the frames to a receive buffer where the data is accessible to software applications executing on the host computing system processor.

The network interface driver allocates memory within the host computing system 15 for the network interface 20. The allocated memory is consolidated into a buffer for frame transfers from the network interface 20 (the 'receive buffer'). The allocated memory addresses typically define a range of continuous memory with sufficient storage capacity for a plurality of data frames (the receive buffer is typically at least an order of magnitude larger than the size of data frames expected from the network). The host computing system 15 allocates the receive buffer in memory that is efficiently accessible by the system processor to optimize data extraction.

The host computing system 15 may allocate memory for several receive buffers that are each capable of receiving a plurality of data frames. However, the total number of receive buffers allocated by the host computing system 15 remains small relative to the number of data frames the system expects to process. Independent receive buffers are typically allocated for individual ports within a multi-port network interface. A single network interface port may distribute frames to more than one receive buffer using programmable filters. Individual receive buffers may not be contiguous within host memory (although the memory allocated to each buffer typically is continuous).

Figure 3:
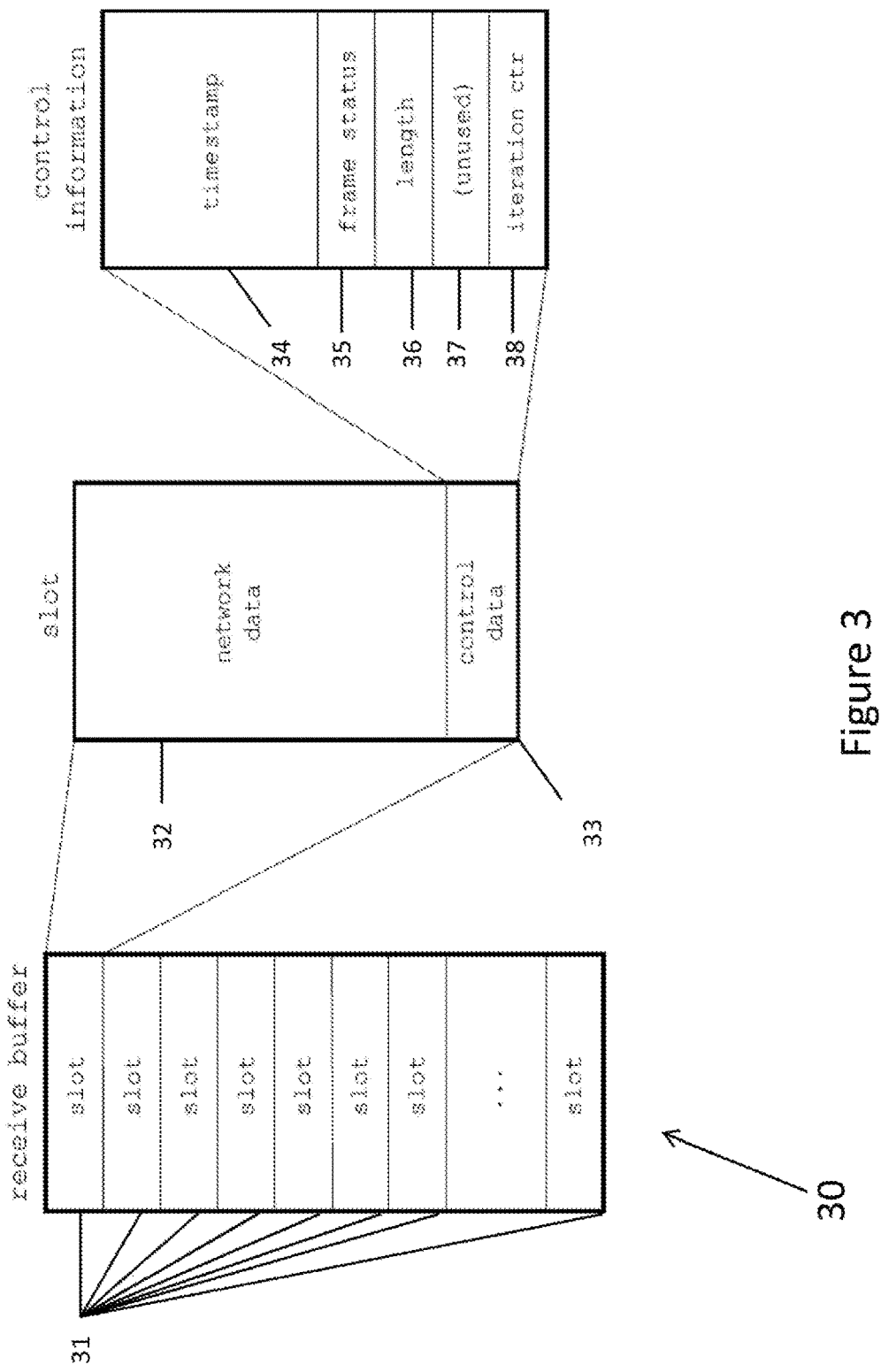
FIG. 3 is a block diagram depicting memory allocation within a receive buffer.

The network interface receive buffers are typically allocated by a dedicated hardware driver during system initiation (such as system startup or following an initialization command). A schematic representation of data allocated within an exemplary receive buffer 30 is presented in FIG. 3.

The network interface 20 divides the memory allocated for each received buffer into a plurality of consecutive slots 31. An integrated buffer management module 27 coordinates division of the allocated memory. The buffer management module 27 creates a plurality of consecutive, individually addressable slots 31 within each receive buffer. The slots 31 generated by the buffer management module 27 are typically homogeneous, with identical storage capacity and uniform memory address offsets. The storage capacity of the slots 31 is typically between 32 bytes and 512 bytes.

The slots 31 enable the network interface 20 to efficiently coordinate write operations to the consolidated receive buffer 30 without intervention from the host computing system. The illustrated network interface 20 uses the allocated memory as a circular buffer, sequentially writing to each of the designated slots 31 before reinitiating the write sequence at a designated memory address (typically coinciding with the first slot). The interface control system 25 autonomously prescribes the allocation of data frames within the receive buffer 30 without intervention from the host computing system (including the interface driver executed by the host computing system).

The illustrated interface control system 25 incorporates a write controller 26 that writes received data frames to the receive buffer 30 using an open-loop write protocol. The write controller 26 recursively overwrites slots 31 within the receive buffer 30 following completion of successive write loops. Data within the receive buffer 30 is overwritten without read confirmation (feedback that the corresponding data has been processed) from the host computing system. Eliminating this feedback from the host system enables the network interface 20 to consecutively write data frames to memory without disruption, increasing the efficiency of data transfer.

The network interface 20 combines control data 33 with the network data 32 written to each slot 31 within the receive buffer 30. The control data 33 is used by the host computing system to manage data extraction from the receive buffer 30. The illustrated control system 25 incorporates a frame management module 28 that generates control data 33 for the network interface 20. The control data 33 generated by the frame management module 28 includes:
 Timestamp (34): 32 bits
 frame status (35): 8 bits
 length (36): 8 bits
 unused (37): 8 bits
 write iteration counter (38): 8 bits The frame management module 28 packages control data 33 with network data 32 in advance of buffer write operations. This allows the write controller 26 to transfer the control data 33 to the receive buffer 30 in the same bus transaction as the network data. The combined data packages are transferred from the network interface 20 to the receive buffer 30 in discrete 'slots'.

The illustrated network interface produces 8 bytes (64 bits) of control data 33 for each slot 31 of the receive buffer 30. One byte (eight bits) of control data 33 is allocated for expansion (the 'unused' data field 37).

The control data 33 is written to individual slots 31 within the receive buffer 30 in a consolidated memory transaction that includes the corresponding network data. This reduces the effective capacity of the slots 31 (the memory available for network data). For example, a 128 byte slot can store 120 bytes of network data 32 and 8 bytes of control data 33. The proportion of control data 33 to network data 32 within a slot 31 increases for smaller slot allocations.

Allocating the control data 33 within the same slot as the corresponding network data 32 avoids ancillary read/write operations that are typically incurred when control data 33 is written to a separate register. The write controller 26 typically writes the control data 33 to a recipient slot in the same bus transaction as the network data. This reduces the write operations needed to transfer a frame to the host computing system. The illustrated write controller 26 appends the control data 33 to the network data 32 so that the control data 33 is written to the end of a corresponding slot within the buffer. This enables the host computing system to validate the buffer write operation by performing a control data 33 check.

The frame management module 28 allocates 4 bytes (32 bits) of control data 33 for a system timestamp 34. The 'timestamp' field 34 documents frame reception times at the network interface 20 (typically used for network analytics and diagnostics). The control system 25 derives the timestamp field 34 from an internal counter.

The illustrated frame management module 28 copies the value of the internal counter to the timestamp field 34 when the first byte of a frame is received from the external network. The same timestamp 34 is used for each frame fragment when a frame is divided between multiple slots 31 within the buffer (i.e. when the data frame is larger than the slot size of the receive buffer 30).

The frame status field 35 contains general status information for received frames. The frame management module 28 documents detected frame reception errors in the 'frame status' field 35. The frame status codes generated by the illustrated control system 25 include:
 0—successful reception
 1—remote sender aborted transmission mid-frame
 2—frame integrity check failed
 3—internal memory overflow during frame reception Received frames that exceed the storage capacity of the buffer slots 31 are divided into frame fragments and distributed to multiple slots 31. The frame management module 28 coordinates division and allocation of large data frames within the buffer. The fragments are typically allocated to consecutive slots 31 within the receive buffer 30.

The frame management module 28 documents the allocation of individual frames within the buffer using the control data 'length' field 36. The length field 36 defines the relationship between consecutive slots 31 within the buffer. A non-zero length field 36 indicates that the frame terminates within the corresponding slot (the slot contains the end of frame boundary that coincides with the slot division. 'Zero' entries in the length field 36 indicate that the adjacent slots 31 contain fragments of the same data frame. The host computing system uses the length field 36 to reconstruct fragmented data frames.

The length field 36 for a frame contained within a single slot 31 identifies the 'size' (typically in bytes) of the frame. Initial or intermediate fragments of a frame are represented by 'zero' entries in the length field 36. This indicates that an additional fragment derived from the same frame is stored in a following (successive) slot. The 'end' fragment of a frame is assigned a length entry commensurate with the fragment size (i.e. the space the fragment occupies within the slot). The non-zero length entry signals to the host computing system that all the fragments for the frame have been extracted from the buffer and the next slot contains a distinct frame.

The buffer management module 27 maintains a 'generation' counter for the receive buffer 30 in a dedicated register within the network interface 20. The generation counter documents the current write iteration for the circular receive buffer 30. The buffer management module 27 monotonically increments the generation counter each time a write loop is completed (i.e. each time the write controller 26 writes data to an end slot within the circular buffer).

The frame management module 28 copies the current value of the buffer generation counter to the 'write iteration counter' control data field 38 during write operations. Software executing on the host computing system uses the write iteration counter 38 to synchronize read operations from the receive buffer 30.

Buffer Access Protocol

The host computing system monitors the receive buffer 30 for write updates from the network interface and extracts new frames as they become available. This process is independent of the network interface write operations in latency sensitive applications. Extracting network data from the receive buffer without intervention from the network interface eliminates several time intensive system interactions (used in conventional network interface protocols to coordinate internal data exchanges). This allows the network interface to transfer data frames to the host computing system with less overhead.

Figure 4:
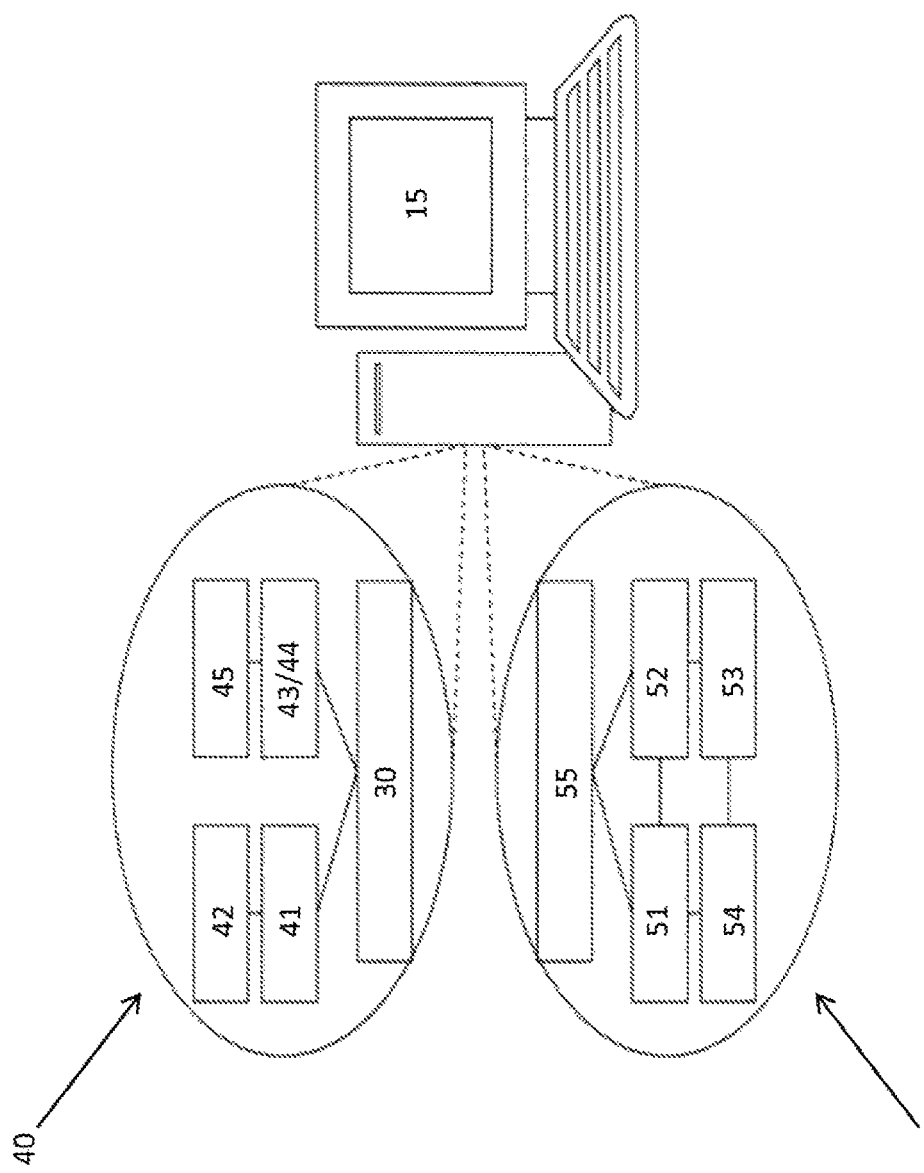
FIG. 4 is a schematic representation of a host computing system depicting various functional modules that coordinate exchanges with a network interface.

The host computing system incorporates a buffer access system that coordinates data extraction from the receive buffer 30. A functional representation of a buffer access system 40 is depicted in FIG. 4. The illustrated buffer access system 40 comprises a plurality of functional modules. The respective modules may be implemented by dedicated driver software or independent software applications executing on the host computing system 15.

The buffer access system 40 illustrated in FIG. 4 incorporates a reference module 41 that evaluates the status of the receive buffer 30 when a data extraction process is initiated. The reference module 41 uses the write iteration counter field 38 to determine the buffer status. The write iteration counter 38 allocated within the control data 33 of each slot 31 defines the write iteration when data was last written to the corresponding slot. The reference module 41 accesses a plurality of data slots 31 within the circular receive buffer 30 and evaluates the write iteration counters 38 contained within the control data 33. The buffer access system 40 uses the write iteration counters 38 from consecutive slots 31 to identify the boundary between current and previous write iterations.

A synchronization module 42 determines the current write address for the circular buffer using the write iteration counters 38 located by the reference module 41. The write address defines the next slot 31 within the receive buffer 30 to be overwritten with data by the network interface 20. The process implemented by the synchronization module 42 to identify the buffer write address is dependent on the format of the write iteration counter field 38 used by the network interface. Identification procedures for binary and integer write iteration counter 38 formats are summarized later in this specification.

The synchronization module 42 communicates the write address to a write monitor 43. The write monitor 43 recurrently polls the write address to check for write updates from the network interface. A write update is detected when the control data 33 within the buffer slot 31 defined by the write address changes. The network interface overwrites both network data 32 and control data 33 during each write update. The write monitor 43 determines that a slot 31 has received a write update when the write iteration counter field 38 for the monitored slot changes.

An extraction module 44 retrieves data from the slot 31 corresponding to the write address when the write monitor 43 detects a write update. The extraction module 44 implements several data validation checks after data is extracted from a slot 31. The validation checks include reception verification (derived from the frame status field 35 of the control data 33), a data integrity evaluation (derived from the integrity of control data 33 appended at the end of each slot 31 during the write update) and an extraction assessment.

The extraction module 44 checks the write iteration counter field 38 of the buffer slot 31 following data extraction to validate the extraction process. If the write iteration counter field 38 has changed subsequent to detection of the original write update identified by the write monitor 43, the extraction module 44 generates a read error. The read error indicates that the slot 31 may have been overwritten by the network interface before data was extracted (making the extracted data unreliable). The recipient software application typically manages read errors by issuing an auxiliary request for the data lost frame.

Fragmented data frames are compiled by a frame reconstruction module 45 following extraction from the receive buffer 30. The frame reconstruction module 45 reads the length reference field 36 from extracted control data 33 following a write update and determines the status of the corresponding network data. The data status distinguishes frame fragments from complete data frames and identifies the relationship between fragments of the same data frame. The frame reconstruction module 45 combines network data 32 from consecutive slots 31 when the length reference field 36 indicates that the respective slots 31 contain data from a single frame. The network interface preserves the order of frame fragments written to the receive buffer 30 so that the frame reconstruction module can compile successive fragments directly from the buffer.

The network interface may use binary or integer write iteration counters to document successive write iterations. Binary write iteration counters distinguish successive write iterations with minimal memory consumption. Integer write iteration counters (such as the 8 bit write iteration counter assigned by frame management module 28) are capable of maintaining an absolute write iteration counter. The data type used for the write iteration counter 38 influences the evaluation process implemented by the synchronization module 42.

Write Address: Binary Write Iteration Counter

The value of a binary write iteration counter alternates with consecutive buffer write loops. This allows the synchronization module 42 to distinguish successive write iterations, but can compromise data validation checks performed by the extraction module 44.

The synchronization module 42 can determine the write address for a buffer by recursively comparing binary write iteration counters from consecutive slots 31 within the buffer. The buffer write address is located by identifying disparate write iteration counters allocated in adjacent slots 31 of the buffer.

Write Address: Integer Write Iteration Counter

Integer write iteration counters record accumulated write iterations. This improves the accuracy of data validation checks implemented by the extraction module 44 at the expense of greater memory usage. The network interface 20 illustrated in FIG. 2 maintains a generation counter that is copied to the write iteration counter field of individual slots 31 during data write operations.

The buffer access system 40 accommodates integer write iteration counters by establishing an auxiliary read iteration counter. The read iteration counter is compared with the control data 33 in consecutive buffer slots 31 to identify the current write address for the receive buffer 30.

The reference module 41 illustrated in FIG. 4 establishes a read iteration counter for the synchronization module 42. The read iteration counter replicates the buffer generation counter maintained by the buffer management module 27. The reference module 41 derives the read iteration counter from control data 33 written to a designated slot 31 within the receive buffer 30. This avoids retrieving the generation counter directly from the network interface.

The illustrated reference module 41 initializes the read iteration counter with the write iteration counter from the final slot of the receive buffer 30. The read iteration counter is typically derived from an end slot of the buffer. The write iteration counter in each end slot remains unchanged for the duration of each write cycle as the generation counter is only incremented at the conclusion of each write cycle (following a write operation to the final buffer slot).

The reference module 41 transfers the read iteration counter to the synchronization module 42. The synchronization module 42 compares the read iteration counter to a plurality of write iteration counters assigned to consecutive slots 31 within the circular buffer. The write address for the buffer coincides with the first slot 31 (the slot 31 closest to the start of the buffer) with a write iteration counter that matches the read iteration counter (derived from the end of the buffer).

The comparison process is coordinated using a read pointer that cycles through successive slots 31 within the receive buffer 30. The buffer access system 40 typically initiates the read pointer at the first slot within the receive buffer 30. The synchronization module 42 increments the read pointer by a defined offset (commensurate with a defined buffer slot size) until the write iteration counter in the slot identified by the read pointer matches the read iteration counter. The offset increments are commensurate with the size of the buffer slots 31 allocated by the buffer management module 27. The synchronization module 42 increments the read pointer to align with successive slots 31 following detected write updates.

Reception Alert Protocol for Latency Insensitive Data

The network interface 20 illustrated in FIG. 2 may implement an alert protocol for reception of latency insensitive network data. The reception alert protocol reduces monitoring overheads on the host computing system.

The alert protocol is initiated by a reservation module (not shown in the drawings) that interfaces with software applications executing on the host computing system. The software applications identify network exchanges that are latency insensitive and communicate network data designations to the reservation module. The reservation module temporarily deactivates the polling function of the write monitor 43 for network data attributable to these exchanges and initiates the network interface alert protocol. This alleviates load on the host computing system processor.

The reservation module may also maintain configurable latency designations for individual software applications that enable global prioritization of latency critical software. A software interface (typically provided by the network interface driver) facilitates configuration of latency designations for individual software applications.

The reservation module initializes a reporting engine integrated with the network interface control system 25 concurrently with deactivation of the write monitor 43. The reporting engine generates a system interrupt when data is written to the receive buffer. The interrupt notifies the reservation module that new data is available within the receive buffer.

Reception alert compatible network interfaces incorporate a dedicated threshold register that the reservation module uses to initialize the alert protocol. The reservation module writes a slot address to the threshold register to activate the reporting engine. The slot address identifies a slot within the receive buffer for the reporting engine to monitor (typically the slot defined by the current buffer write address). The reporting engine interfaces with the write controller 26 and generates a notification interrupt when the slot identified by the slot address receives a write update.

The slot address written to the threshold register is typically an integer reference that identifies a slot offset within the receive buffer. The reporting engine compares the slot address in the threshold register with the write address maintained by the write controller 26 and generates a system interrupt when the write address is equal or exceeds the slot address.

Writing an absolute slot reference (such as the slot address) to the threshold register compensates for concurrent write operations by the write controller 26 and reservation module. Concurrent write operations occur when the reservation module writes to the threshold register concurrently with (or fractionally after) a write update to the current write address. The reporting engine detects a concurrent write update by identifying that the write controller sequence number exceeds the slot address written to the threshold register. This is not possible with binary activation of the reporting engine.

Transmission of Data to External Networks

Most network interfaces use bus mastering or programmed input/output (programmed I/O) protocols to coordinate internal data transfers with a host computing system. Both protocols are implemented using standardized internal system buses.

Early network interfaces implemented programmed input/output protocols (programmed I/O) to communicate with host computing system processors. The programmed I/O protocol facilitates low bandwidth host controlled communications via an internal system bus (such as parallel ATA bus). Outgoing network data is 'pushed' to the network interface in small packages (usually 16 bit or 32 bit) by writing to I/O address space within the host computing system. The host computing system processor performs the I/O writes at high frequencies. This can consume resources and create overheads for the host computing system, including excessive system bus bandwidth consumption and disproportionate processor loading. These limitations are largely addressed by bus mastering protocols.

Most conventional network interfaces use bus mastering protocols to coordinate outgoing network data (data being sent from the host computing system to an external network). Bus mastering enables the network interface to manage bus transactions and move outgoing network data within the host computing system with minimal overheads for the host computing system processor.

Software executing on the host computing system initiates the transfer process by notifying the network interface of new outgoing network data. Notifications are sent from the processor to the network interface using an internal system bus. The network interface then autonomously retrieves the corresponding data from host memory. This involves issuing a read request to the host memory and receiving the outgoing network data (both exchanges use the system bus).

Embodiments of the transmission protocol described in this section enable the host computing system processor to write outgoing network data directly to a transmission buffer within network interface memory. This is facilitated by mapping the transmission buffer to the memory hierarchy of the host computing system. Writes to the transmission buffer are released in bursts to avoid several inefficiencies associated with programmed I/O protocols. This is facilitated by collecting outgoing network data in a write-combine buffer (typically allocated within the host computing system processor) before releasing the data to directly addressable memory within the network interface (the transmission buffer).

The disclosed transmission protocol eliminates several data management exchanges between the host processor and network interface that are used in bus mastering to coordinate internal data transfers. The eliminated exchanges include:

read requests from the network interface to host memory retrieving the new data, and transmission of the new data from the host computing system memory to the network interface.

This improves the latency performance of the disclosed network interface as the eliminated exchanges have to be performed before data is transferred to the network interface using bus mastering protocols.

A functional representation of a data transmission system 50 is depicted in FIG. 4. The illustrated data transmission system 50 includes a memory management module 51 that supervises a transmission buffer 29 within dedicated network interface memory. The transmission buffer typically has between 4 kilobytes and 2 megabytes of storage capacity (although larger storage capacities may be used). The network interface 20 depicted in FIG. 2 may be supplied with a 16 kilobyte, 32 kilobyte or 64 kilobyte transmission buffer 29.

Figure 5:
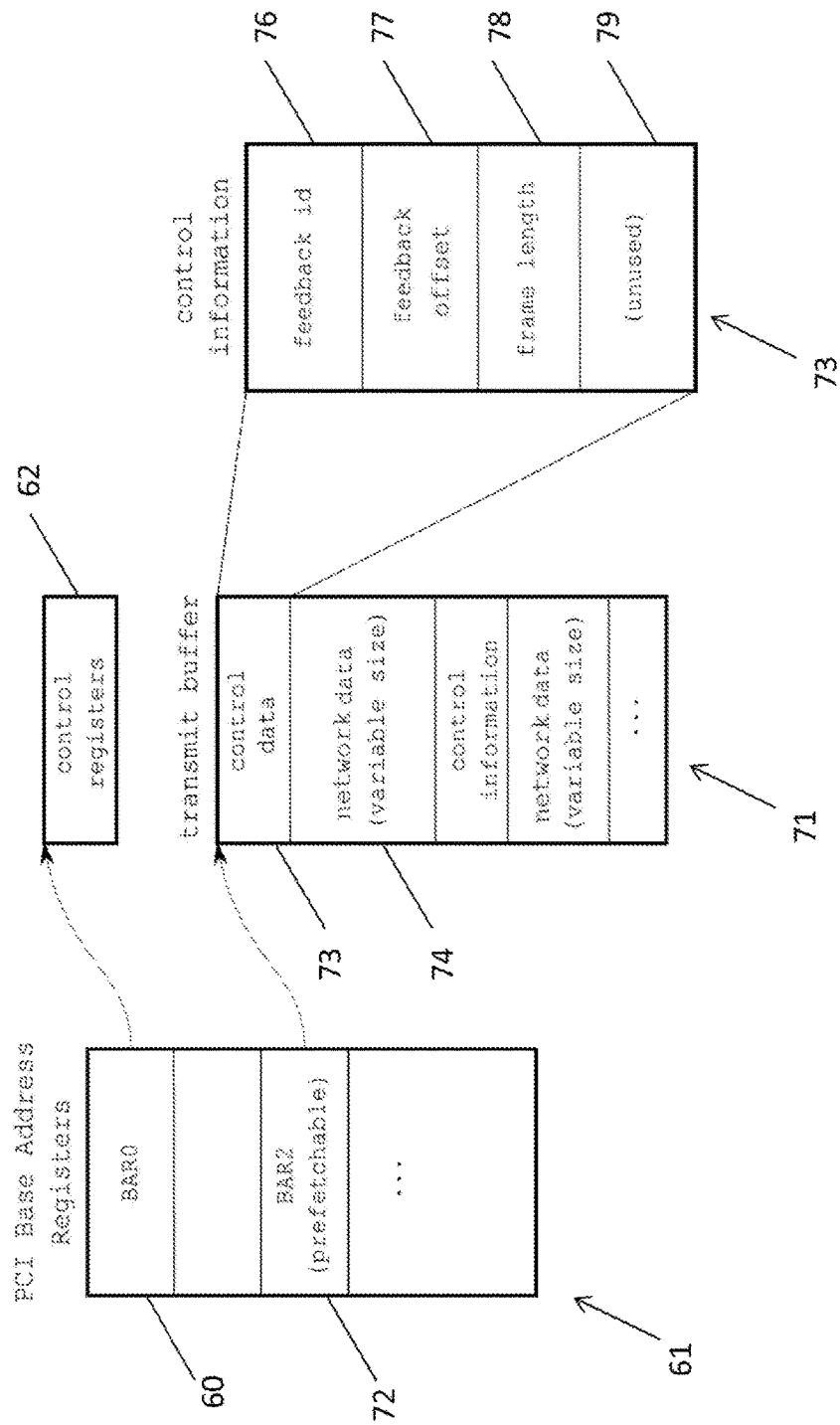
FIG. 5 is a block diagram depicting memory allocation within a network interface.

The memory management module 51 maps the dedicated network interface memory to a local memory hierarchy 61 within a host computing system 15. This makes the mapped memory (corresponding to the transmission buffer 29) directly addressable by the host computing system processor. The memory management module 51 also enables write-combining for the mapped memory (this is achieve by setting a 'prefetchable' attribute in PCI bus applications). A schematic representation of data allocated within the mapped memory 61 is presented in FIG. 5.

The transmission system 50 incorporates a write controller 52 that coordinates data writes to the network interface 20. The write controller 52 writes outgoing network data 74 to the mapped memory 55 (transmission buffer 29) using an internal system bus. The outgoing network data 74 is written to the transmission buffer 29 without intervention from the network interface 20. The write controller collects outgoing network data 74 within a write-combine buffer allocated in the host computing system processor before writing to the network interface. This allows the outgoing network data 74 to be written to the transmission buffer 29 in bursts (instead of small bit packages).

The write controller 52 typically writes outgoing network data 74 to the transmission buffer 29 in data frames that are packaged for transmission to an external network. This allows the network interface 20 to extract outgoing network data 74 from the transmission buffer 20 and transmit the data with minimal additional processing. The data frames may be combined with control data 73 that facilitates the extraction of individual frames from the transmission buffer 29.

The transmission system 50 illustrated in FIG. 4 incorporates a control module 53 that combines control data 73 with the data frames written to the transmission buffer 29. The control module 53 prepends control data 73 to each data frame before the respective frames are transferred to the network interface 20 by the write controller 52. The write controller 52 writes the control data 73 to the transmission buffer 29 in the same transaction as the corresponding data frames. The control data 73 is usually prefixed to a corresponding data frame and stored with the outgoing network data 74 in a transmission buffer. The control data 73 generated by the control module 53 illustrated in FIG. 4 includes:

frame identifier (76): 16 bits
feedback offset (77): 16 bits
frame length (78): 16 bits
unused (79): 16 bits The control module 53 generates 8 bytes (64 bits) of control data for each data frame. Two bytes (sixteen bits) of control data is allocated for expansion (the 'unused' data field 79).

The control data 73 generated by the control module 53 includes feedback descriptors that enable the network interface to report frame transmissions and a length field that defines the size of a corresponding data frame within the transmission buffer 29. The control data 73 prepended to each frame is standardized.

The control module 53 initiates transmission of data frames to an external network by writing frame references to a separate control register 62 within the network interface 20. The frame references define the location of corresponding data frames within the dedicated buffer memory. The control module 53 typically specifies the frame reference as an offset within the dedicated memory buffer 29.

A transmission engine that is integrated with the network interface (not shown in the drawings) extracts individual data frames from the buffer 29 for transmission to an external network. The frame reference and frame length 78 fields define the bounds of the corresponding data frames within the dedicated memory buffer. The transmission engine uses these fields to extract the frame from the transmission buffer 29.

The transmission engine initiates the extraction process by initializing a frame pointer with a buffer memory address defined by the frame reference. The frame pointer typically coincides with the control data 73 prefixed to a corresponding data frame. The transmission engine reads the frame length 78 contained in the control data 73 for the frame and determines an end address for the frame.

The network interface 20 transmits the frames extracted from the transmission buffer 29 to an external network. A confirmation message can be sent to the host computing system following transmission if requested by the source software application. A notification engine (not shown in the drawings) manages confirmation messaging using the feedback descriptors contained in the control data 73 for a corresponding frame. The notification engine extracts the feedback descriptors from the dedicated network interface memory in the same transaction as the corresponding data frame. The feedback descriptors are defined by the software application that generated the frame.

Figure 6:
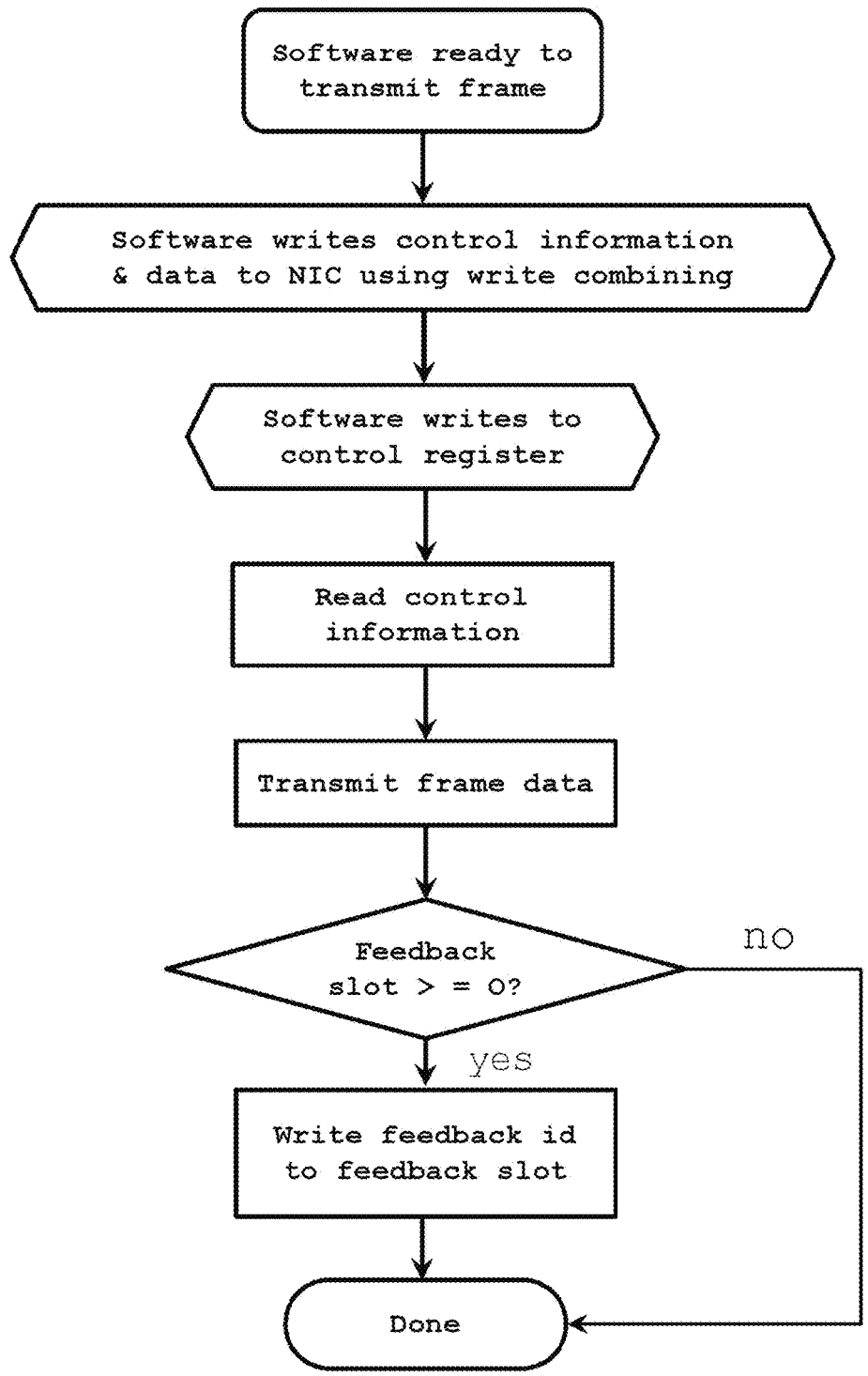
FIG. 6 is a flow diagram representation of a transmission process for transferring data from a computing system to a network interface.

The notification engine writes a 'frame identifier' 76 extracted from the dedicated network interface memory to an allocated feedback register within host computing system memory to report frame transmissions. The feedback register is defined by the 'feedback offset' field 77 incorporated in the control data 73. This typically represents an offset within a feedback array 54 (maintained in host computing system memory) that the software application monitors for write confirmation. A software application can decline confirmation messages by setting defined bits within the 'feedback offset' field 77. An exemplary embodiment of the transmission protocol (including the feedback process) is depicted in the flow chart presented in FIG. 6.

The specific protocols used by the write controller 52 and memory management module 51 to implement the transmission process are dependent on the system bus that conveys data between the host processor and network interface. An implementation using the PCI bus standard is briefly explained in this section. The transmission process may also be implemented using other system bus standards.

The memory management module 51 maps the dedicated interface memory for the transmission buffer to a dedicated base address register (BAR) within the host computing system memory hierarchy 61 (such as base address register two 72 for PCI bus implementations). This allows the write controller 52 to use write-combining for the mapped memory 55. The memory management module 51 also enables write combining for the mapped memory 55. The control registers 62 used to initiate frame transmission are mapped separately to I/O space (typically base address register zero 60) by the memory management module 51.

Forwarding Network Data within the Network Interface

The network interface 20 depicted in FIG. 2 is capable of implementing several data forwarding functions that are conventionally performed by specialized network switching equipment. The network interface 20 accommodates the additional forwarding functions by transferring network data internally between ports. This avoids latency that is introduced in conventional applications by forwarding network data to an intermediary switch.

The network side 21 of the network interface 20 includes a plurality of data ports. The data ports may be integrated with hardware connectors that form a physical connection with compatible physical media (such as Small Form-Factor Pluggable Modules) as illustrated in FIG. 2. Each data port defines a data channel for the exchange of network data between the network interface control system 25 and the external data network. The network interface 20 may also incorporate wireless data ports (not illustrated) that define a wireless data channel connection with an external network.

The network interface control system 25 can facilitate data logging by copying network data exchanged with individual data ports to a logging port. The copied network data is packaged into a consolidated data stream for transmission to an external logging system. The network interface control system facilitates the logging process without intervention from a host computing system.

Logging enabled embodiments of the network interface control system 25 incorporate a logging module 85 that coordinates data logging within the network interface 20. The logging module 85 replicates network data from individual data channels (defined by the network interface ports) and transfers the replicated data to a designated logging port. A logging unit combines replicated data from a plurality of data ports for transmission to an external logging system. The logging unit generates a consolidated logging data stream that is transmitted to an external data network via the logging port.

The logging module 85 includes a logging interface that facilitates dynamic logging reconfiguration. The logging interface has a plurality of control registers that designate data channels for logging (replication and transmission to a remote logging server). The control registers may be dynamically set by a system administrator to enable/disable logging for individual ports.

The logging module may facilitate independent logging for separate data streams within a data channel (including send and receive streams). Independent data stream logging is coordinated by a logging controller. The logging controller separates individual data streams from a single data channel and forwards designated streams independently to the logging unit. The logging interface may facilitate data stream logging by allocating dedicated control registers for individual streams within a data channel.

Figure 7:
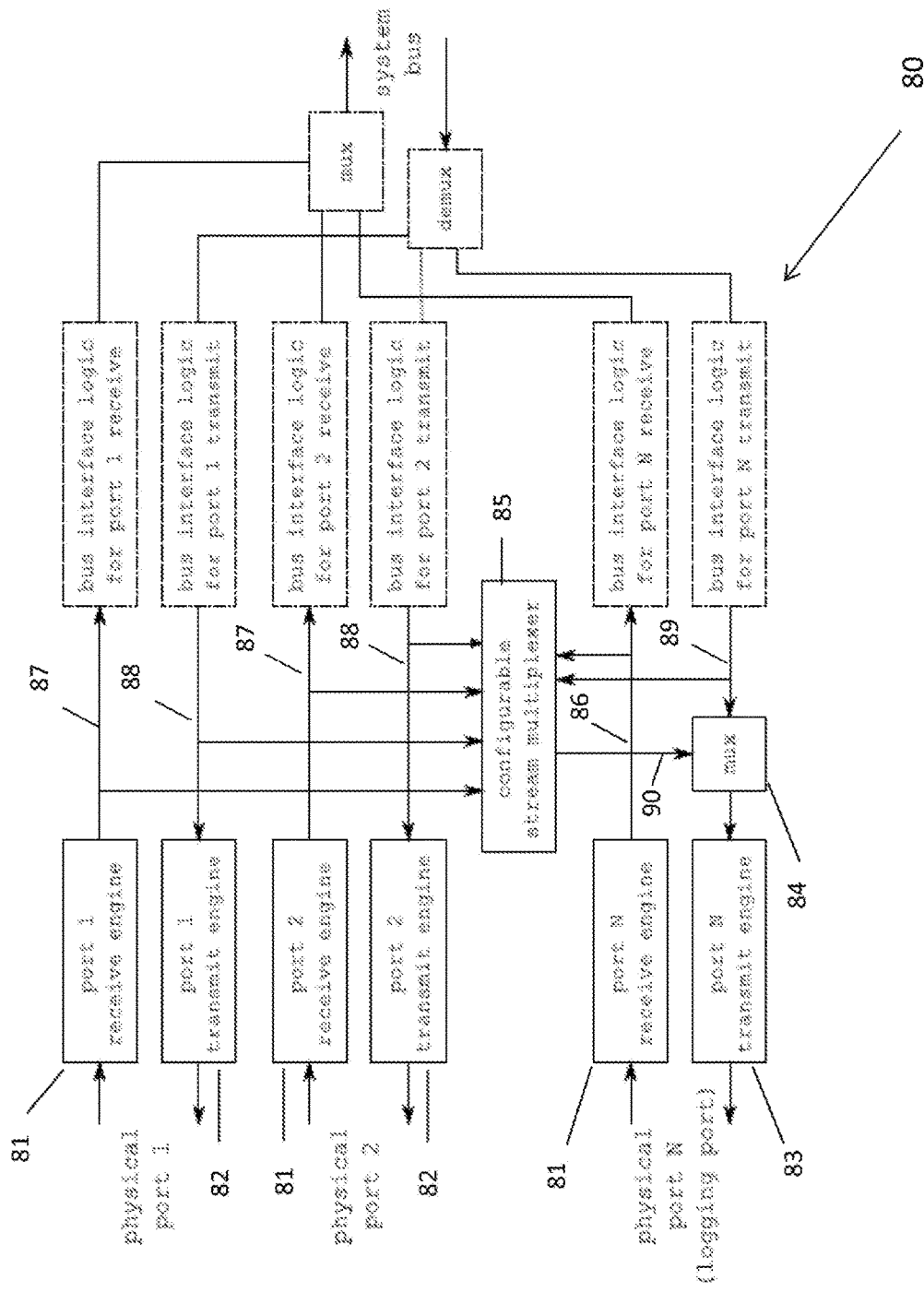
FIG. 7 is a block diagram representation of a network interface logging function.

A block diagram 80 depicting independent logging for send and receive data streams within several data channels is depicted in FIG. 7. Each data port is represented by a receive engine 81 and a transmit engine 82 which propagate the receive 87 and send 88 data streams respectively. Each data stream is replicated and copied to a logging module 85.

A dedicated logging unit (not shown in the drawings) combines data frames from the individual data streams into a consolidated logging stream 90 for transmission from the network interface (via logging port transmit engine 83). The individual data streams incorporated in the consolidated logging stream 90 are selected by the forwarding module 85 using dynamically configurable control registers.

The logging port depicted in FIG. 7 manages regular network communications in addition to the logging stream 90 generated by the logging module 85. A multiplexer 84 transfers the outgoing network data from the logging port send stream 89 and logging stream 90 to the logging port transmit engine 83. The multiplexer 84 may be integrated with the logging unit in some embodiments.

The logging port send 89 and receive streams 86 are replicated and transferred to the logging module 85 for inclusion in the logging stream 90 with data streams from other data ports.

The network interface control system 25 may facilitate data forwarding between ports of the network interface 20. Data forwarding is facilitated by transferring received data from a designated port (the 'forwarding port') to another port of the network interface (the 'destination port'). The illustrated network interface 20 autonomously forwards data received at the forwarding port without intervention from a host computing system. This allows the data to be transferred between ports within the network interface 20.

Forwarding enabled network interface control systems include a forwarding module that receives data directly from the forwarding port and transfers the received data to an external data network via another data port (the destination port). The forwarding module can transfer the received network data autonomously, without intervention from the host computing system. This avoids latency associated with transferring data to the host computing system operating system.

The filtering module can filter network data received at the forwarding port, selectively forwarding data that is not addressed to the host computing system. A filtering engine (usually integrated with the forwarding module) reads the destination address of data received at the forwarding port. The destination address is typically defined in metadata accompanying the network (such as a packet header). The filtering module retains data with a destination address that matches the address of the host computing system.

A forwarding interface facilitates configuration of the forwarding module (including activation of the filtering engine). The forwarding interface has a control register that disables data forwarding between two ports when set by a system administrator.

The forwarding function of the network interface allows computing systems to share a common network connection without using an external network switch or optical splitter.

Figure 8:
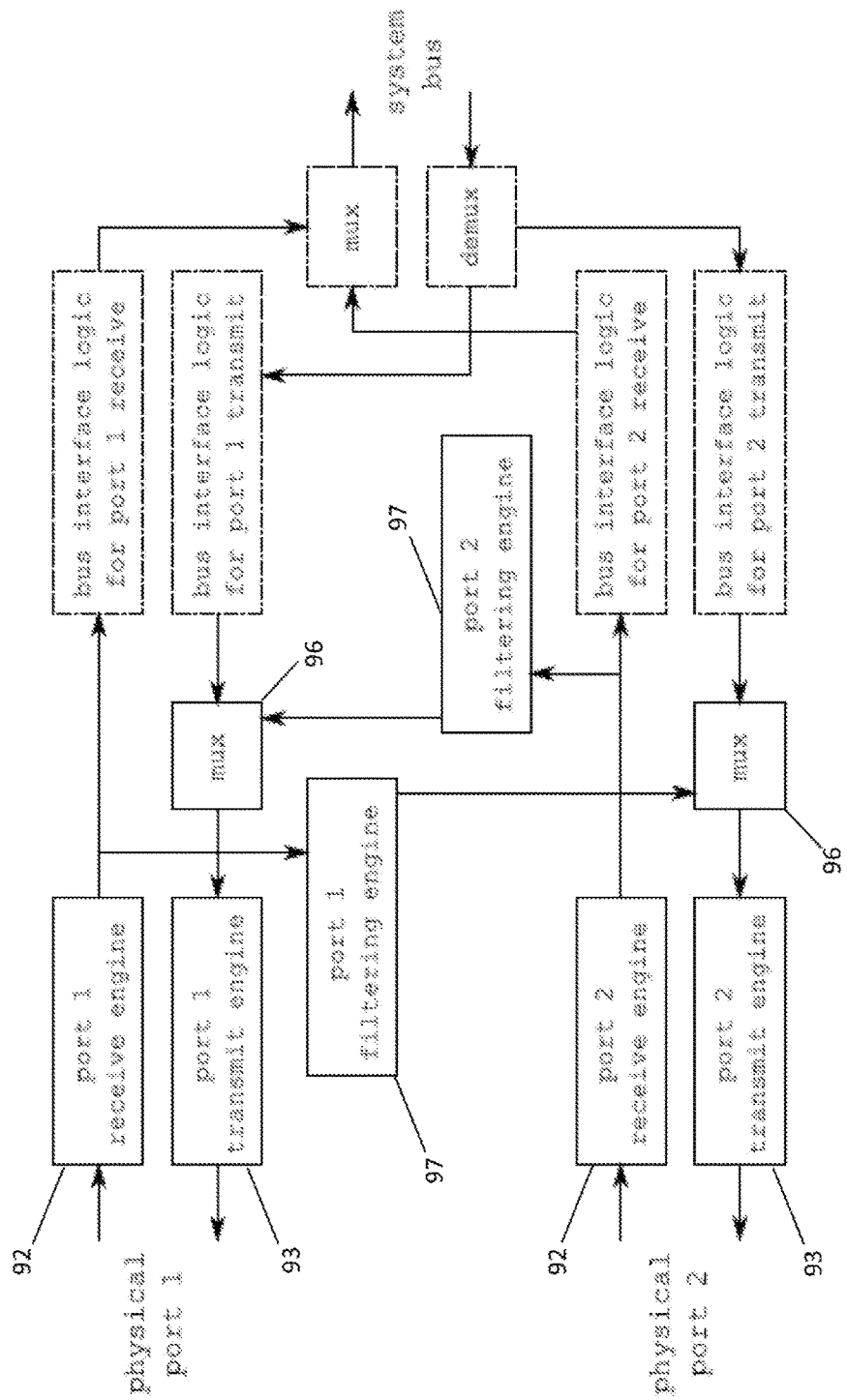
FIG. 8 is a block diagram representation of a networking interface port forwarding function.

An exemplary port forwarding implementation 91 is depicted in FIG. 8. The depicted implementation 91 has a symmetrical port forwarding configuration with linked data ports that reciprocally exchange received data. Both data ports comprise dedicated receive 92 and transmit 93 engines that facilitate communication with external networks.

Incoming network data frames are received by the receive engines 92. The respective ports transfer all the frames received at the receive engines 92 to a filter engine 97. Each receive engine 92 has a dedicated filtering engine 96 in the illustrated embodiment.

The filtering engines 97 read a destination address from each of the received data frames. Data frames with a destination address that matches the address of the host computing system are redirected to the network interface control system for dissemination to a receive buffer. Data frames with a destination address that does not match the address of the host computing system are designated for retransmission to an external network.

The filtering engine may distribute data frames from the forwarding port to multiple destinations (typically the destination port and the host computing system). This enables the filtering engine to redirect data frames to the network interface control system 25 when the destination address does not match the address of the host computing system (useful for logging and applications). The data distribution criteria adopted by the filtering engine are typically defined using the forwarding interface.

The filtering engine may select a subset of data frames received at the forwarding port for distribution to multiple destinations. This is often used to manage unsolicited data (such as broadcast and multicast frames). The filtering engine may also indiscriminately distribute data frames received at the forwarding port when set to a promiscuous mode.

The filtering engine 97 transfers a filtered data stream (the frames with addresses that are different to the address of the host computing system) to the transmit engine 95 of the linked destination data port. A multiplexer 96 combines the filtered data stream with outgoing network data from the host computing system.

The port forwarding implementation depicted in FIG. 8 enables a 'master' computing system to share a network connection with a 'slave' computing system without an auxiliary network switch. The illustrated implementation defines the port forwarding configuration for the 'master' computing system (the computing system with a direct connection the external network).

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

The invention claimed is:

1. A data reception process comprising:
   receiving a plurality of data frames from an external network via a network interface, and
   transferring each of the data frames from the network interface to a receive buffer allocated within memory of a host computing system via an internal system bus,
   the network interface prescribing the allocation of data frames within the receive buffer without intervention from the host computing system transferring each of the received data frames from the network interface to the receive buffer using an open-loop write protocol, in which the received data frames are successively written to a continuous memory range within the receive buffer and the received data frames recursively overwrite the receive buffer without read confirmation of previously written frames from the host computing system.

2. The process of claim 1 comprising allocating the receive buffer within continuous memory that has storage capacity for a plurality of data frames.

3. The process of claim 2 comprising dividing the allocated memory into a plurality of consecutive individually addressable slots with homogeneous storage capacity.

4. The process of claim 3 comprising writing received data frames consecutively to each of the slots within the receive buffer.

5. The process of claim 3 comprising fragmenting received data frames that exceed the storage capacity of the slots and allocating the frame fragments to a plurality of consecutive slots within the receive buffer.

6. The process of claim 5 comprising generating control data that facilitates reconstruction of fragmented data frames by defining the relationship of frame data in consecutive slots.

7. The process of claim 6 comprising appending the control data to the end of each frame fragment so that the control data is written to the end of a corresponding slot in the same bus transaction as the frame fragment.

8. The process of claim 7 wherein the control data also defines the length of the frame fragment allocated to the corresponding slot.

9. A network interface comprising:
   a network side that receives a plurality of data frames from an external data network,
   a host side that transfers the data frames to a receive buffer allocated within memory of a host computing system via the hosts internal system bus, and
   a control system that prescribes the allocation of data frames within the receive buffer without intervention from the host computing system;
   a write controller configured to transfer each of the received data frames to the receive buffer using an open-loop write protocol, the write controller further being configured to write the data frames successively to a continuous memory range within the receive buffer, wherein the open-loop write protocol comprises recursively overwriting the receive buffer without read confirmation of previously written frames from the host computing system.

10. The network interface of claim 9 comprising a buffer management module that allocates a plurality of consecutive individually addressable slots with homogeneous storage capacity within continuous memory allocated to the receive buffer.

11. The network interface of claim 10 comprising a write controller that transfers received data frames consecutively to each of the slots within the receive buffer.

12. The network interface of claim 11 comprising a frame management module that fragments received data frames that exceed the storage capacity of the slots and allocates the frame fragments to a plurality of consecutive slots within the receive buffer.

13. The network interface of claim 12 wherein the frame management module generates control data that facilitates reconstruction of fragmented data frames by defining the relationship of frame data in consecutive slots.

14. The network interface of claim 13 wherein the write controller appends the control data to the end of each frame fragment so that the control data is written to the end of a corresponding slot in the same bus transaction as the frame fragment.

15. The network interface of claim 13 wherein the control data also defines the length of the frame fragment allocated to the corresponding slot.

16. A buffer access system comprising:
   a reference module that accesses a plurality of data slots within a circular buffer and evaluates a write iteration counter from each of the accessed slots, the write iteration counter defining a write iteration when data was last written to the respective slots, a synchronization module that determines a write address for the circular buffer, the write address defining the next slot to be overwritten with data, and a write monitor that recurrently polls the write address to detect a write update, the write update being determined from a change in the write iteration counter for the corresponding slot.

17. The system of claim 16 wherein:

the reference module copies a write iteration counter from a designated slot within the circular buffer and establishing a read iteration counter from the copied write iteration counter, and the synchronization module compares the read iteration counter to a plurality of write iteration counters assigned to consecutive slots within the circular buffer to identify the write address.

18. The system of claim 17 wherein the synchronization module initiates a read pointer at a designated slot within the circular buffer, compares the write iteration counter assigned to the designated slot with the read iteration counter and increments the read pointer to align with successive slots within the circular buffer until the read pointer coincides with the write address.

* * * * *